UNITED STATES PATENT OFFICE.

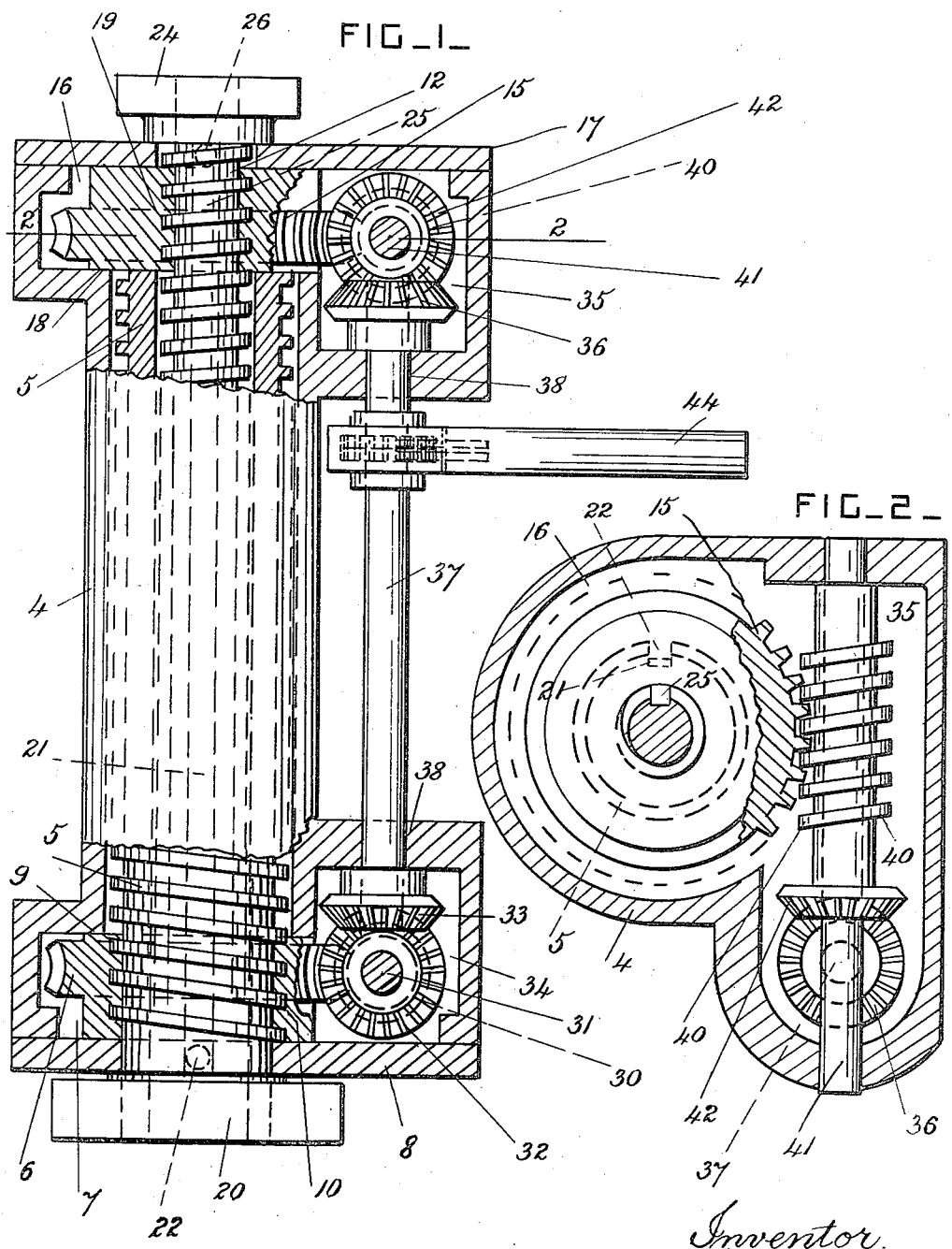

CHARLES H. H. THODE, OF CAMP LEWIS, WASHINGTON.

LIFTING JACK.

1,402,192.  Specification of Letters Patent.  Patented Jan. 3, 1922.

Application filed April 5, 1921. Serial No. 458,668.

*To all whom it may concern:*

Be it known that I, CHARLES H. H. THODE, a citizen of the United States, residing at Camp Lewis, in the county of Pierce and State of Washington, have invented certain new and useful Improvements in Lifting Jacks, of which the following is a specification.

This invention relates to lifting jacks provided with screws for lifting the load; and it consists in the novel construction and combination of the parts hereinafter fully described and claimed.

In the drawings, Figure 1 is a side view, partially in section, of a lifting jack constructed according to this invention. Fig. 2 is a sectional plan view, taken on the line 2—2 in Fig. 1.

The housing or casing 4 of the jack is tubular and cylindrical and 5 is a screw arranged in the said housing and free to slide longitudinally. A worm wheel 6 is provided on one end portion of the screw 5, and is arranged in a chamber 7 at one end of the housing. This chamber 7 is closed by a cover 8, and the hub of the worm wheel runs in contact with the cover 8 and a shoulder 9 on the housing. The hub of the worm wheel 6 has a screw-threaded hub portion or nut 10 which engages with the threads of the screw 5 so that the screw is slid longitudinally when the worm wheel is revolved.

The screw 5 is tubular, and 12 is an internal screw arranged in the tubular passage 14, and free to slide longitudinally in it. A worm wheel 15 is provided at the other end of the screw 12 from the worm wheel 6, and is arranged in a chamber 16 at the other end of the housing from the chamber 7. The chamber 16 is closed by a cover 17, and the hub of the worm wheel works between this cover 17, and a shoulder 18 on the housing. The worm wheel 12 is provided with a screwthreaded hub or nut 19 which engages with the internal screw 12. The two screws preferably have their threads cut right and left.

A head plate 20 is secured to the outer screw 5 outside the housing, and the screw 5 has a longitudinal slot 21 which engages with a projection 22 on the cover plate 8, so that the screw cannot be revolved. A head plate 24 is secured to the inner screw 12 outside the housing, and the screw 12 has a longitudinal slot 25 which engages with a projection 26 on the cover plate 17.

The screws 5 and 12 are slid simultaneously in the housing, each one moving longitudinally in the opposite direction to the other, by any suitable gearing. A worm 30 engages with the worm wheel 6, and its shaft 31 is journaled in bearings on the housing, and has a beveled toothed wheel 32 secured on it.

A beveled toothed wheel 33 is arranged in gear with the wheel 32, and works in a pocket 34 on the chamber 7. A similar pocket 35 is formed on the chamber 16, and a beveled toothed wheel 36 is arranged in it. The wheels 33 and 36 are secured on a shaft 37 which is journaled in bearings 38 on the bottoms of the respective pockets, which project from the said chambers.

The worm wheel 15 has a worm 40 arranged in gear with it, and provided with a shaft 41 which is journaled in bearings on the housing. A beveled toothed wheel 42 is secured on the shaft 41, and gears into the beveled toothed wheel 36. The shaft 37 is revolved by hand by means of a ratchet lever 44. Any other appliance may be used for revolving the shaft 37 by hand or by power, but a lever provided with a reversible ratchet mechanism of any approved construction is preferred, so that the shaft 37 can be revolved step by step in each direction.

The two screws are moved simultaneously and outwardly of the casing to raise the load when the shaft 37 is revolved in one direction, and they are moved inwardly when the shaft 37 is revolved in the opposite direction. The worm gearing also operates to sustain the load, so that it is not lowered until required.

What I claim is:

1. In a lifting jack, a housing, a tubular outer screw slidable longitudinally in the housing, an inner screw slidable inside the said outer screw, screwthreaded driving members arranged at the ends of the housing and engaging with the respective screws, and means for revolving the said driving members simultaneously to slide each screw in the reverse direction from the other.

2. In a lifting jack, a housing, a tubular outer screw slidable longitudinally in the housing, an inner screw slidable inside the said outer screw, worm wheels arranged at the ends of the housing and provided with screwthreaded hubs which engage with the respective screws, worms gearing into the said worm wheels, and means for revolving the worms simultaneously so that each screw is slid in the reverse direction from the other.

3. In a lifting jack, a housing having chambers at its ends provided with projecting pockets, a tubular outer screw slidable longitudinally in the housing, an inner screw slidable inside the said outer screw, means for preventing the said screws from revolving, worm wheels arranged in the said chambers and provided with screwthreaded hubs which engage with the respective screws, worms gearing into the said worm wheels, intergearing beveled toothed wheels arranged in the said chambers and pockets and operatively connected with the said worms, a shaft journaled in the bottoms of the said pockets and adapted to drive the beveled toothed wheels simultaneously, and means for revolving the said shaft.

In testimony whereof I have affixed my signature.

CHARLES H. H. THODE.